United States Patent
Willyoung

[15] 3,660,705
[45] May 2, 1972

[54] POLYPHASE GENERATOR WINDINGS

[72] Inventor: David M. Willyoung, Scotia, N.Y.

[73] Assignee: General Electric Company

[22] Filed: Apr. 24, 1970

[21] Appl. No.: 31,496

[52] U.S. Cl. .............................................. 310/198, 310/205
[51] Int. Cl. ........................................................ H02k 3/00
[58] Field of Search ................. 310/198, 199, 195, 202, 203, 310/205, 206, 207, 179, 171

[56] References Cited

UNITED STATES PATENTS

| | | | |
|---|---|---|---|
| 2,015,562 | 9/1935 | Kilgore | 310/202 |
| 2,778,962 | 1/1957 | Taylor | 310/202 |
| 2,778,963 | 1/1957 | Habermann | 310/202 |
| 3,152,273 | 10/1964 | Harrington | 310/198 |
| 3,201,627 | 8/1965 | Harrington | 310/198 |
| 3,408,517 | 10/1968 | Willyoung | 310/202 |
| 3,470,409 | 9/1969 | Scheda | 310/202 |

Primary Examiner—J. D. Miller
Assistant Examiner—R. Skudy
Attorney—William C. Crutcher, Frank L. Neuhauser, Oscar B. Waddell and Joseph B. Forman

[57] ABSTRACT

Each phase of a polyphase armature winding is constituted by a pair of phase belts, each belt consisting of three segments of the winding. The first and third segments in each belt are connected in series with one another and the remaining segment is series-connected with a corresponding segment of the opposite phase belt. Each phase is thus constituted by three separate circuits, but only a single connection ring per phase is necessary to connect segments laying on opposite sides of the armature.

3 Claims, 6 Drawing Figures

Patented May 2, 1972

INVENTOR:
DAVID M. WILLYOUNG,

BY W. C. Crutcher
HIS ATTORNEY.

Patented May 2, 1972

INVENTOR:
DAVID M. WILLYOUNG,
BY W. C. Crutcher
HIS ATTORNEY.

3,660,705

POLYPHASE GENERATOR WINDINGS

BACKGROUND OF THE INVENTION

The present invention relates generally to the windings of polyphase dynamoelectric machines, and more particularly to an improved armature connection wherein each phase of the armature windings may consist of a plurality of parallel circuits with a minimum of space required in the end turn region for winding interconnections.

A polyphase generator may comprise a two-pole field element rotatable within a stationary cylindrical armature, or stator. The armature core is formed of a suitable material such as is well known in the art and is provided with a plurality of radial slots which are formed in and extend axially along the inner surface of the stator core. The armature windings are each carried within appropriate ones of these slots, and may be combined into a desired pattern or configuration so as to provide multi-phase electric power. Typically, three separate phases are provided within the stator, and a two-pole field element is rotated therewithin at 3,600 rpm to produce three-phase electric power at a frequency of 60 cycles per second.

In order to connect the aforementioned windings into the desired configuration, connecting rings to provide appropriate connection between individual winding segments are usually provided at one end of the stator, extending peripherally about the ends of the stator core. Since the windings are usually connected into groups consisting of a plurality of individual windings which are distributed about a portion of the inside diameter of the stator, many connections are necessary. Due to the limited space available between the inner and outer diameters of the stator core, the connections are usually constructed in layers which extend axially outward from the end of the stator. It will be appreciated that the more complex the connection configuration, the more connections will be necessary, thus utilizing additional material and causing the overall length of the machine to increase. This not only increases the size and weight of the machine but requires a longer span between support points for the rotor shaft, necessitating a larger diameter and stronger shaft.

Many efforts have been made to obtain maximum power and efficiency from a polyphase generator of the type described above by modifying the stator winding circuit configuration. Two improvements in this field are those disclosed in U.S. Pat. No. 2,778,963, granted on Jan. 22, 1957 to Rudolph Habermann, Jr.; and in U.S. Pat. No. 3,152,273, granted on Oct. 6, 1964 to D. B. Harrington, both of which are assigned to the assignee of the present invention. In both of these patents it is taught that each of the three phases of an armature winding may consist of three parallel circuits, each of which comprises a pair of series-connected segments of the winding. According to the prior art, one segment of each circuit is located in one phase belt and the other segment, connected in series therewith is located in another phase belt disposed at diametrically opposed point within the stator.

The coils constituting various winding segments of the phase belts are interleaved in a suitable sequence to minimize phase imbalance among the three individual circuits. The sequence may be any of the several arrangements taught by the prior art, although it has been found advantageous to use reversed, or "mirror-image," sequence in opposite phase belts so that corresponding coils in series-connected segments simultaneously occupy nearly the same electrical position under rotor poles of opposite polarity.

It has been the practice to series-connect diametrically opposite segments i.e., those under opposite poles. This necessitates the use of connection rings to connect the segments in series. Because of the presence of the rotor, such series connections must be routed about the circumference of the stator through an arc of approximately 180°. Since there are three phases and three circuits within each phase, there must necessarily be at least nine series connection rings within each machine so connected.

It is therefore an object of the present invention to provide a polyphase dynamoelectric machine each phase thereof comprising a plurality of parallel circuits, but requiring a reduced number of connection rings.

It is a further object of the present invention to provide a dynamo-electric machine whose phases are each constituted by a plurality of parallel circuits, the windings comprising at least some of which circuits are disposed entirely within a single phase belt.

SUMMARY OF THE INVENTION

The subject invention contemplates the series connection of pairs of winding segments which are distributed under a common pole and have voltages of a common magnitude generated therein. Since there are in the disclosed embodiment three winding segments distributed under any pole, the series connection of two of such segments leaves one segment unconnected. This leftover, or "odd" segment is connected in series with the corresponding segment beneath the opposite rotor pole by means of a connection as is taught by the prior art.

By distributing first segments of pairs of winding segments in a first sequence in a phase belt, and the second segments of said pairs in the reverse or "mirror-image" sequence in the same phase belt, the voltages generated in said first and second segments will automatically be identical in magnitude, although offset in phase angle from each other and from the phase position of the vector sum resulting from their series connection, (which necessarily must fall at a phase angle corresponding to the centerline position of said phase belt). Since the first and second segments utilize corresponding circuit positions symmetrically disposed about the centerline of the phase belt, the remaining circuit positions which the third segment must occupy are automatically equally disposed about the phase belt centerline, so that the phase angle of the generated voltage in the third segment corresponds to that of the centerline of the phase belt, and that of the vector sum of said first and second phase belt segments.

BRIEF DESCRIPTION OF THE DRAWINGS

The invention, both as to its organization and principle of operation, together with further object and advantages thereof, will best be understood with reference to the following specification taken in connection with the accompanying drawings, in which.

DESCRIPTION OF THE PREFERRED EMBODIMENT

Figure 1:
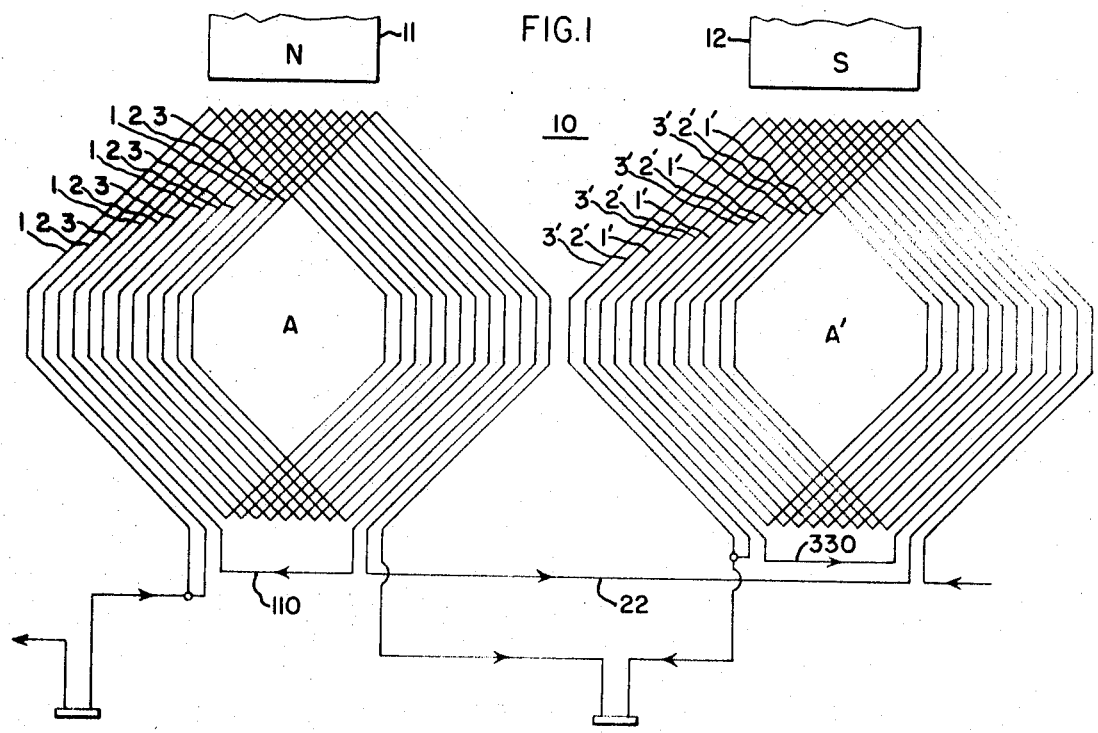
FIG. 1 is a schematic illustration of a portion of a polyphase dynamoelectric machine showing the stator coils comprising one phase of the armature winding thereof.

Referring now to FIG. 1 of the drawings, there is illustrated a developed length of a stator core 10 of a polyphase generator, and poles 11 and 12 of a rotor, such as is found in a typical AC generator. For purposes of illustration, the generator will be considered to be of the two-pole, three phase type, each phase consisting of three individual circuits. The windings are separated into first and second phase belts A and A' which are displaced 180° with respect to one another within the stator. Each phase belt consists of three segments, each of which is constituted by a plurality of series-connected coils. The coils of first, second and third segments of first phase belt A are denoted 1, 2 and 3, respectively. Corresponding segments of second phase belt A' are denoted 1', 2' and 3+, respectively. To equalize the phase of net voltages of circuits comprising pairs of said segments, it will be noted that individual coils of the winding segments are distributed in a first sequence in the first phase belt. While it is recognized that different sequences may be selected, for purposes of illustration sequences 123123123123 and 3'2'1'3'2'1'3'2'1'3'2'1' are used for phase belts A and A', respectively.

Figure 2:
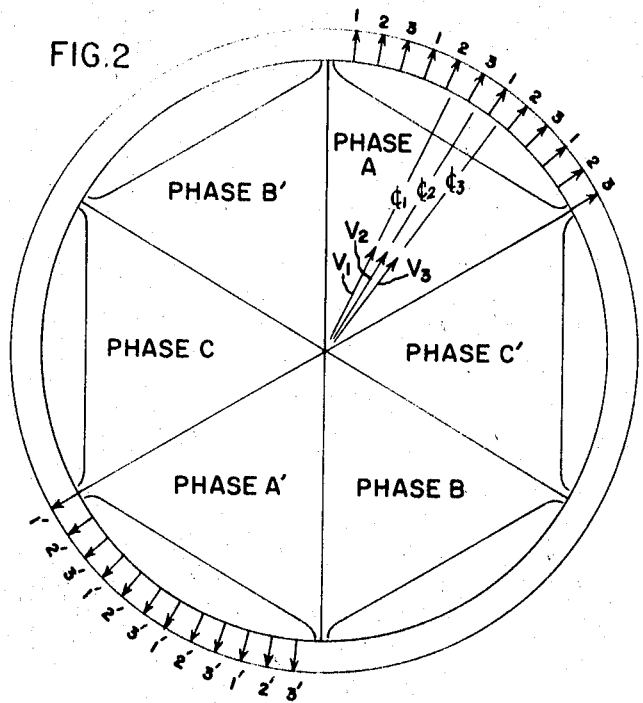
FIG. 2 is a combined schematic diagram of the phase belt arrangement in an armature winding and a vectorial diagram of the phase voltage components induced in the different coils of one phase of the winding.

Referring now to FIG. 2, it will be seen that the centerlines of the groups of coils constituting the winding segments are not colinear. The coils of the various segments cyclically alternate in succeeding stator core slots, the centerline of each segment being thus displaced from that of the other segments of the same phase belt by the distance separating corresponding coils of the segments. In the illustrated embodiment, for example, the centerline of segment 3 is displaced one core slot from that of segment 2, and two core slots from that of segment 1. The phasors representing voltages induced in these segments, labeled $V_1$, $V_2$ and $V_3$ and lying along the centerline of each segment, are therefore similarly displaced. Since there are 72 core slots in the illustrated embodiment, the angle $\theta$ between adjacent phases is that of one core slot, or 5°.

As indicated in FIG. 2, the armature windings of a three-phase generator comprise three "positive" phase belts (respectively designated A, B and C), and three "negative" phase belts (respectively designated A', B' and C') arranged in sequence about the inner diameter of stator core 10. Each phase belt is identical in that it is constituted by three circuit segments, each segment comprising a plurality of series-connected coils, and the coil sides of the segments being arranged in a suitable sequence in the core slots.

DISCUSSION OF THE PRIOR ART

Figure 3:
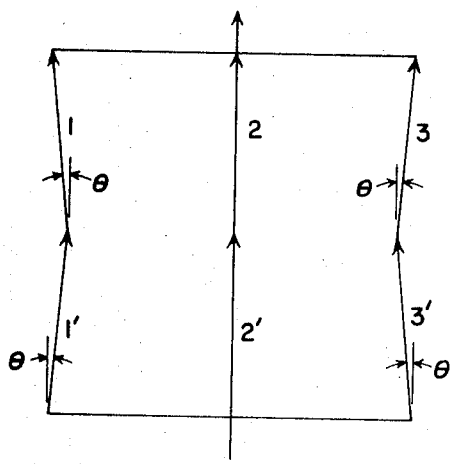
FIG. 3 is a vector diagram of the voltages induced in the aforementioned segments when connected according to the prior art.

FIG. 3 shows a vector representation of the segment voltages generated according to a prior art arrangement of the aforementioned Harrington U.S. Pat. No. 3,152,273. It will be seen that all such segment voltages are of the same magnitude. While voltages generated in winding segments 1 and 3 of phase belt A are $2\theta°$ out of phase with respect to the voltages generated in corresponding winding segments 1' and 3' respectively, of phase belt A', the net vector sums are in phase with one another and with the voltages generated in winding segments 2 and 2'.

Figure 4:
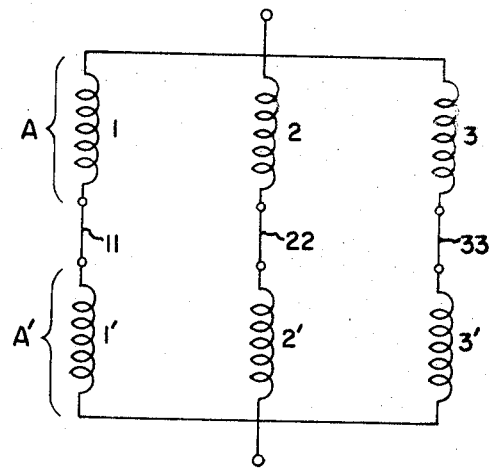
FIG. 4 is a corresponding schematic diagram of the prior art showing the series connection of winding segments into pairs which comprise the circuits of a phase winding.

Referring now to FIG. 4, a simplified schematic diagram of the six segments constituting two phase belts of a single phase is shown. As pointed out above, the segments in phase belt A are displaced 180° within the stator from those of phase belt A'. Corresponding segments in each phase belt are connected in series by means of connection rings 11, 22 and 33 to form three circuits, each constituting one-third of a phase. For example, segment 1 of phase belt A is series-connected with segment 1' of the phase belt A'. Since the voltage being generated in phase belt A by an N pole is identical to the corresponding voltage generated in phase belt A' by an S pole, the voltage in winding segments 2 and 2', which are located symmetrically about the centerlines of their respective phase belts, are in phase with each other and with their resultant sum. The voltages generated in series-connected segments 1 and 1' are identical in magnitude but have equal but opposite phase angle displacements from their resultant sum. The same is true for series-connected segments 3 and 3'. Therefore, the phase angle of the resultant voltages for all circuits is the same, and the magnitude of the resultant voltages for segments 1—1' and 3—3' is very nearly equal to that for series-connected segments 2—2'.

Circuits 1, 2 and 3 are constituted by connecting the proper segments in series by means of connection rings 11, 22 and 33 respectively. Since the series-connected segments are located approximately opposite one another within the stator, it is thus necessary for the connection rings to extend approximately one-half way about the periphery of that stator core in order to connect the segments. Since there are three phases, each consisting of three parallel circuits, a total of nine connection rings must be used. The only available space for these connection rings is at the ends of the stator core, where space is at a premium. All coil connections are also made at the stator core ends and, in the case of machines having fluid-cooled windings, provision must be made for routing the cooling fluid from one coil to the next, and for conducting the fluid to and from the external heat exchanger. It will thus be seen that the presence of the aforementioned nine connection rings in this prior art winding arrangement causes the length of the generator stator to increase significantly, and complicates assembly of the windings.

SCHEMATIC AND VECTOR DIAGRAMS OF ONE PREFERRED EMBODIMENT

Figure 5:
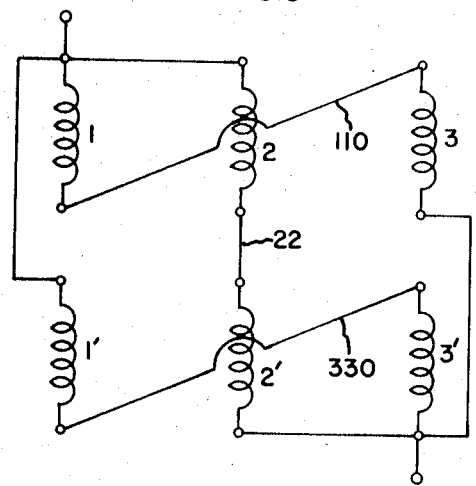
FIG. 5 is a schematic diagram showing the connection of winding segments taught by the present invention.

FIG. 5 is a schematic diagram showing the winding arrangement of the subject invention. A pair of segments in each phase belt are series-connected by leads 110 and 330, the remaining segment being connected in series with its mate in the opposite phase belt by means of connection ring 22. Although connections must still be made between segments 1 and 3, and 1' and 3', referring back to FIG. 1, it will be noted that since the segments are composed of windings which are distributed beneath the same pole the connection between the segments need only be very short.

Figure 6:
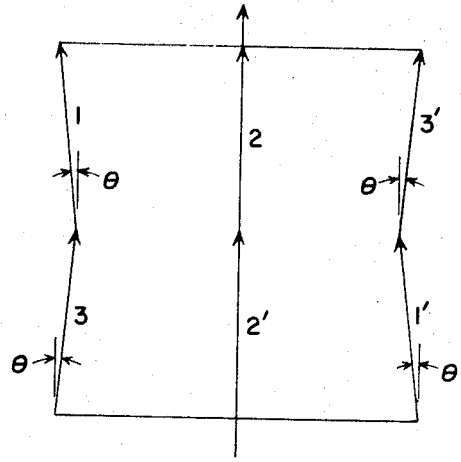
FIG. 6 is a vector diagram of the voltages induced in the segments when connected according to the teaching of the present invention.

FIG. 6 is a vector diagram of the voltages generated in the various segments, with the vectors relocated to indicate the connection scheme taught by the subject invention. It will be seen that vectors representing voltages generated in winding segments 1 and 3 are now additive; similarly, vectors representative of voltages generated in winding segments 1' and 3' are also additive. As was the case with the prior art circuit of FIG. 3, the vector sums of these voltages are in phase with one another and also in phase with the voltages generated in segments 2 and 2'. The circuit of the subject invention thus provides an output which is electrically identical to that of the prior art, although the interconnection of winding segments is significantly different. It will be understood by those skilled in the art seen that the circuit of the subject invention may be used with various winding patterns wherein the sequence of the coils constituting the various winding segments is different from that shown in the present embodiment. Further, the advantages inherent in the prior art in the use of a plurality of paralled circuits for each phase of a polyphase generator are still present, and are in no way diminished by the connection configuration taught by the present invention.

While the embodiment described herein is considered to be the preferred embodiment of the subject invention, it will be understood that various modifications may be made therein, such as utilizing a different sequence of placement of the windings beneath a given pole, or the series connection of segments employing connections from segment ends opposite those depicted. It will also be understood that while the invention has been described in an embodiment utilizing only a single pair of poles, it can be employed with equal efficacy to machines utilizing more than one pair of poles, by connecting the phase winding sections from each pole-pair, as herein described, or in series or in equal series-parallel combinations. It is intended that the appended claims cover such modifications as well as any others which may fall within the true spirit and scope of the invention.

What is claimed as new and desired to be secured by Letters Patent of the United States is:

1. In a dynamoelectric machine having a polyphase armature winding, each phase of said winding comprising a first and a second phase belt, the winding segments constituting said first phase belt being distributed in a first sequence within a stator, and the winding segments constituting said second phase belt being distributed in a stator in a second sequence which is the inverse of said first sequence:
  a. first conductor means for serially connecting pairs of winding segments having generated therein voltages of substantially equal magnitude, and located in common phase belts;
  b. second conductor means for serially connecting a first winding segment of a first phase belt and a second winding segment of a second, opposing phase belt, said winding segments having generated therein voltages of substantially equal phase and magnitude; and
  c. third conductor means for connecting in parallel the circuits constituted by said serially-connected winding segments of said first and second phase belts.

2. A polyphase generator winding according to claim 1 wherein said first and said second phase belts each include a first, second and third winding segment, said first and third winding segments of each phase belt being connected in series, and said second winding segment of said first phase belt being connected in series with said second winding segment of said second phase belt.

3. A polyphase generator winding according to claim 2 wherein said third conductor means connects each circuit constituted by said serially-connected winding segments of said first and second phase belts in parallel whereby only one of said circuits has a 180° connection between said winding segments.

* * * * *